(12) United States Patent
Gerstenmeier et al.

(10) Patent No.: US 7,099,795 B1
(45) Date of Patent: Aug. 29, 2006

(54) SYSTEM FOR CHANGING AND/OR EVALUATING A SPEED SIGNAL

(75) Inventors: Juergen Gerstenmeier, Beilstein (DE); Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/125,404

(22) PCT Filed: Nov. 12, 1997

(86) PCT No.: PCT/DE97/02649

§ 371 (c)(1),
(2), (4) Date: May 12, 1999

(87) PCT Pub. No.: WO98/28172

PCT Pub. Date: Jul. 2, 1998

(30) Foreign Application Priority Data

Dec. 20, 1996  (DE) ......................................... 196 53 262

(51) Int. Cl.
*G01P 15/00* (2006.01)
*G01P 3/00* (2006.01)

(52) U.S. Cl. ............................ 702/148; 73/488; 73/495
(58) Field of Classification Search ................. 702/147, 702/148; 73/509, 514.39, 488; 701/70, 79, 701/83
See application file for complete search history.

(56) References Cited

U.S. PATENT DOCUMENTS 4,076,330 A    2/1978   Leiber
5,848,672 A  * 12/1998  Brearley et al. ......... 188/1.11 L
5,952,799 A  *  9/1999  Maisch et al. ............. 318/362
6,109,102 A  *  8/2000  Schneider et al. ............ 73/488
6,122,577 A  *  9/2000  Mergenthaler et al. ....... 701/34

FOREIGN PATENT DOCUMENTS

| DE | 26 06 012 | 8/1977 |
| DE | 32 01 811 | 9/1983 |
| DE | 34 07 716 | 9/1985 |
| DE | 43 22 440 | 2/1995 |
| DE | 44 31 045 | 3/1996 |
| DE | 196 18 867 | 2/1997 |
| EP | 0 727 666 | 8/1996 |
| GB | 2 070 776 | 9/1981 |
| GB | 2 202 016 | 9/1988 |

OTHER PUBLICATIONS

R. Schiefer, "Integrierte Hall–Effekt–Sensoren zur Positions– und Drehzahlerkennung". elektronik industrie, Jul. 1995, pp. 29–31. Described in the Specification of the above–identified application.

"Neue, alternative Lösungen für Drehzahlsensoren im Kraftfahrzeug auf magnetoresisitiver Basis,", VDI Reports No. 509, 1984. Described in the Specification of the above–identified application.

* cited by examiner

*Primary Examiner*—Patrick J. Assouad
(74) *Attorney, Agent, or Firm*—Kenyon & Kenyon (57) ABSTRACT

A system for a transmission of several additional pieces of information by a single modification of a speed signal. In addition to the modification of the speed signal in the area near the wheel (modified speed sensor), the system provides the special evaluation of the speed signal, modified, at a distance from the wheel (controller). In addition, the system naturally also includes the combination of the special speed sensor and the controller.

20 Claims, 9 Drawing Sheets

Fig. 1

PRIOR ART

SYSTEM FOR CHANGING AND/OR EVALUATING A SPEED SIGNAL

FIELD OF THE INVENTION

The present invention relates to a system for changing and/or evaluating a signal representing the rotation speed of at least one with the features set forth in the preambles of the independent claims.

BACKGROUND INFORMATION

Measuring the speeds of rotation of the vehicle wheels for control of the braking force, drive force and/or driving dynamics of a motor vehicle in open or closed loop is known. To do this in conventional manner, various methods (e.g. Hall or magneto-resistive sensors) are used. In addition, measuring the wear of the brake pad of a vehicle is known in that, for example, contact pins are embedded at a specific depth of the brake pads, which trigger a contact upon actuation of the brake when the brake pad is worn to this depth.

For example, the article "Integrierte Hall-Effekt-Sensoren zur Positions-und Drehzahlerkennung" (Integrated Hall Effect Sensors for Position and Speed Recognition) of the journal "elektronik industries," 7-1995, pp. 29–31, describes active sensors for use in the motor vehicle for anti-lock braking, traction control, engine and transmission open-loop and closed-loop control systems. Such sensors supply two current levels in a two-wire circuit which are converted into two voltage levels by a measuring resistor in an appropriate controller.

In addition to the Hall effect sensors, the use of magneto-resistive sensors is also known for speed recording, e.g., from the article "Neue, alternative Lösungen für Drehzahlsensoren im Kraftfahrzeug auf magnetoresisitiver Basis," (New Alternative Solutions for Speed Sensors based on Magnetoresistance of the Motor Vehicle), VDI Reports No. 509, 1984.

German Patent No. 26 06 012 (U.S. Pat. No. 4,076,330) describes a special common arrangement for detecting the wear on a brake pad and for detecting the wheel speed. To do this, the brake pad wear detected and the wheel speed detected by an inductively operating sensor are supplied via a common signal line to an analyzer. This is achieved in that the wheel speed sensor is completely or partially short-circuited in response to a detected brake pad wear.

Other systems as described, for example, in German Patent No. 43 22 440, require at least two signal lines between one wheel unit and the analyzer for detecting the speed and the brake pad wear on a wheel and a wheel brake, respectively.

In the speed detection method mentioned above, it is known that the air gap between the rotating ring gear and the actual sensor element has a considerable influence on the quality of the speed signal. Reference is made in this respect to e.g., German Patent Application No. 32 01 811.

The above-mentioned information (for example, brake pad wear and air gap/signal quality) is generally detected near the wheel and evaluated in a control unit mounted at a distance from the wheel. To do this, the information must be transmitted to the controller.

German Patent Application No. 196 18867.9 describes how to modify a rotational-speed signal in various specifiable ways for transmitting additional information (excessive brake pad wear, air gap that is too large/defective signal quality). The modification is carried out in different ways depending on the additional information to be transmitted. Making the different modifications of the speed signal requires a certain amount of effort.

The object of the present invention is to implement a very simple and reliable transmission of the speed signal and other information.

SUMMARY OF THE INVENTION

The present invention relates to a transmission of several pieces of additional information by a single modification of a rotation speed signal. In addition to the modification of the speed signal according to the present invention in the area near the wheel (modified speed sensor), the system according to the present invention provides the special evaluation of the speed signal modified according to the present invention in the area at a distance from the wheel (controller). In addition, the present system according to the present invention also includes the combination of the special speed sensor and the controller.

During the modification of a signal representing a rotary movement of a vehicle wheel, the system according to the present invention includes first means for generating a first signal representing the rotary movement and second means for generating at least two further signals, in each case one of the additional signals representing various operating conditions of at least two different devices as additional information. Such devices can be, for example, the first means (e.g., speed sensor) itself or the brake pad of a wheel brake present at the vehicle wheel. In addition, third means are provided with which the first signal can be modified in a specifiable manner as a function of the further signals.

According to the present invention, the third means are structured in such a way that the modification is specified in a single way, and this modification is carried out as a function of at least one of the further signals.

The modification according to the present invention of the speed signal has the advantage that the additional information (for example, about the air gap/signal quality and/or the brake-pad wear mentioned at the outset) can be transmitted in a simple and reliable manner via the speed-sensor output line. This eliminates, for example, the second signal line mentioned at the outset provided exclusively for the transmission of the additional information. In particular, the present invention exhibits, in comparison to German Patent Application No. 196 18867.9, the advantage that at least two different pieces of additional information (e.g., excessive brake pad wear, defective signal quality/excessively large air gap) can be transmitted by only a single possible change of the speed signal. In the subject matter of 196 18867.9, either only one single additional piece of information is superimposed on the speed signal or, in the case of several pieces of additional information, this additional information is superimposed on the speed signal in a coded manner which requires a certain amount of effort in circuit and/or programming technology. According to the present invention, at least two additional pieces of information are transmitted simultaneously by a single modification of the speed signal. If it is assumed that only one single speed modification is possible, according to the present invention all the additional pieces of information lead to the possible modification of the speed signal and are thus output, instead of an alternative decision being made for one of several additional pieces of information. In this context, the speed sensor and the detection of the above-mentioned additional information form one compact unit.

In evaluating a signal representing a rotary movement of a vehicle wheel, the invention assumes that the vehicle wheel has a wheel brake and the signal for transmitting additional pieces of information, e.g., wear of the brake pad of the wheel brake or quality of the signal, is changed in a manner that can be specified.

According to another embodiment of the present invention, mean are provided for generating at least one signal representing an actuation of the wheel brake. In addition, the system according to the present invention has evaluation means, by which the signal or the modified signal is (gated) combined at least with the generated signal representing a brake actuation. At least two signals representing the additional pieces of information are then formed as a function of this combination.

The evaluation of the speed signal or of the modified speed signal according to the invention has the advantage that additional pieces of information, e.g., regarding the air gap/signal quality and/or the brake-pad wear mentioned at the outset, can be transmitted via the sensor output line in a simple and reliable manner. The evaluation of the speed signal according to the present invention falls back upon signals that are generally present in the controller anyway. In so doing, use can be made of a brake-lights-switch signal and/or a signal representing the brake pressure as information regarding brake actuation.

The present invention also relates to the overall system that is based on a system for changing and evaluating a signal representing a rotary movement, which has first means for generating a signal representing the rotary movement and second means for generating at least two additional signals. In this context, in each case, one of the additional signals represents different operating conditions of at least two other devices as additional information. Such devices may be the speed sensor itself or the brake pad. In addition, third means are present by which the first signal can be modified as a function of the further signals in a manner that can be specified. By using fourth means, the first or the modified first signal is evaluated, at least one signal being generated as a function of this evaluation, the signal representing the various operating conditions of at least two different devices.

According to another embodiment of the present invention, fifth means for generating at least one signal representing a brake actuation are provided, and the third means are structured in such a way that the change can be specified in a single manner. This change is made as a function of at least one of the further signals. The fourth means are structured in such a way that the first or the modified first signal is combined (gated) with at least the generated signal representing one brake actuation. As a function of this combination, at least two signals are then formed representing the additional pieces of information.

The entire system naturally combines the above-mentioned advantages of the individual systems.

Another embodiment of the present invention provides that at the end of the vehicle production (end of the assembly line) a relatively simple test for correct installation of the speed sensors can be carried out. Since at this point at the end of the line, the brake pad is new, a modification according to the present invention of the speed signal can only result from an incorrectly installed speed sensor.

In another embodiment of the present invention, it is provided that the first means are structured such that the first signal assumes at least two initial current values and/or at least two initial voltage values. The third means are then structured in such a way that to change the first signal in a single manner that can be specified, at least one of the initial current values and/or at least one of the initial voltage values can be changed to a second current value and/or a second voltage value for at least a specific time as a function of the second signal. This embodiment assumes in particular that the first means are designed as an active speed sensor known in and of itself.

The generating means, or the fifth means, can additionally be designed to generate at least one of the signals representing the vehicle velocity.

In addition, the gating in the evaluating means, or in the fourth means, can be advantageously designed so that the signals representing the additional information are formed from the time correlation of the signal representing the wheel brake actuation to the specifiable change of the signal representing the rotary movement of a vehicle wheel.

The second means are advantageously designed to generate a signal representing brake-pad wear on at least one vehicle wheel brake and/or to generate a signal representing the amplitude of a signal joined to the first signal (speed signal).

In particular, the first, second and third means are near the wheel and/or the fourth and fifth means, or the evaluation means, are mounted at a distance from the wheel.

DETAILED DESCRIPTION

Figure 1:
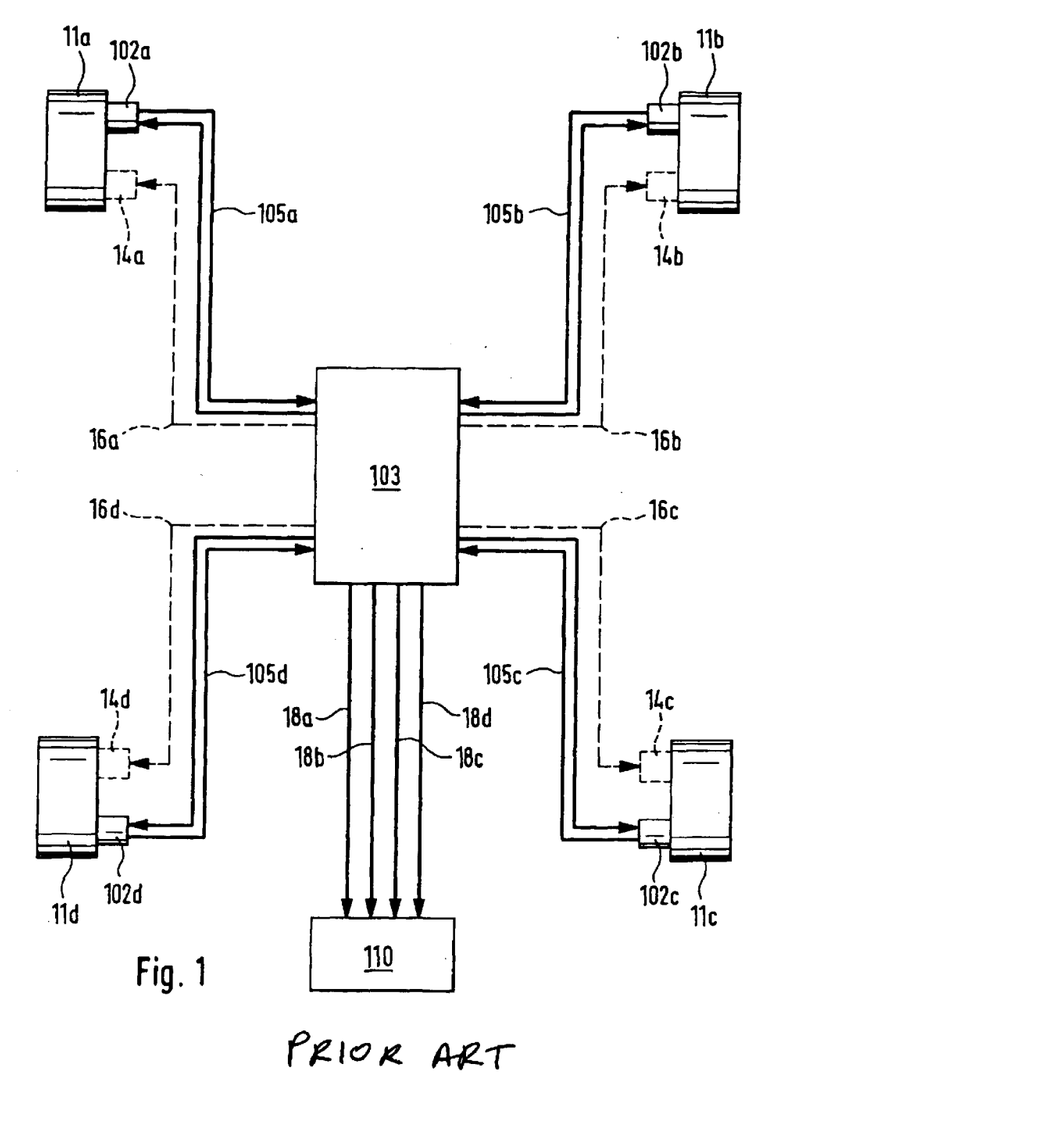
FIG. 1 shows a schematic block diagram of a conventional system.

FIG. 1 shows, as a schematic block diagram, a system for determining brake pad wear and wheel speeds in a motor vehicle.

The wheel units of a motor vehicle are designated with reference numbers 11a–d. These wheel units include, in particular, the wheels, the rotation speeds of which (wheel speeds) will be measured and the brake system (friction brake) allocated to each wheel unit. The speed sensors and brake-pad-wear sensors allocated to each wheel are indicated with reference symbols 102a–d, and will be described in more detail using FIGS. 2, 3a, 3b and /or 3c in so far as they concern the invention. Reference is made explicitly to the related art mentioned above with regard to the structure of these sensors, which is beyond the scope of the present invention.

The output signals of speed sensors and brake-pad-wear sensors 102a–d are put through to controller 103, the transmission lines being represented by 105a–d. The information transmitted by transmission lines 105a–d is then evaluated centrally for all wheel units in controller 103. The condition of the brake pads is supplied as evaluation result by controller 103 to display instrument 110 by way of lines 18a–d. Generally the driver is given appropriate information in the event of a certain degree of wear of one or more brake pads.

For the sake of completeness, the brake systems of individual wheel units 11a–d which can be controlled from controller 103 are sketched with reference characters 14a–d.

Figure 2:
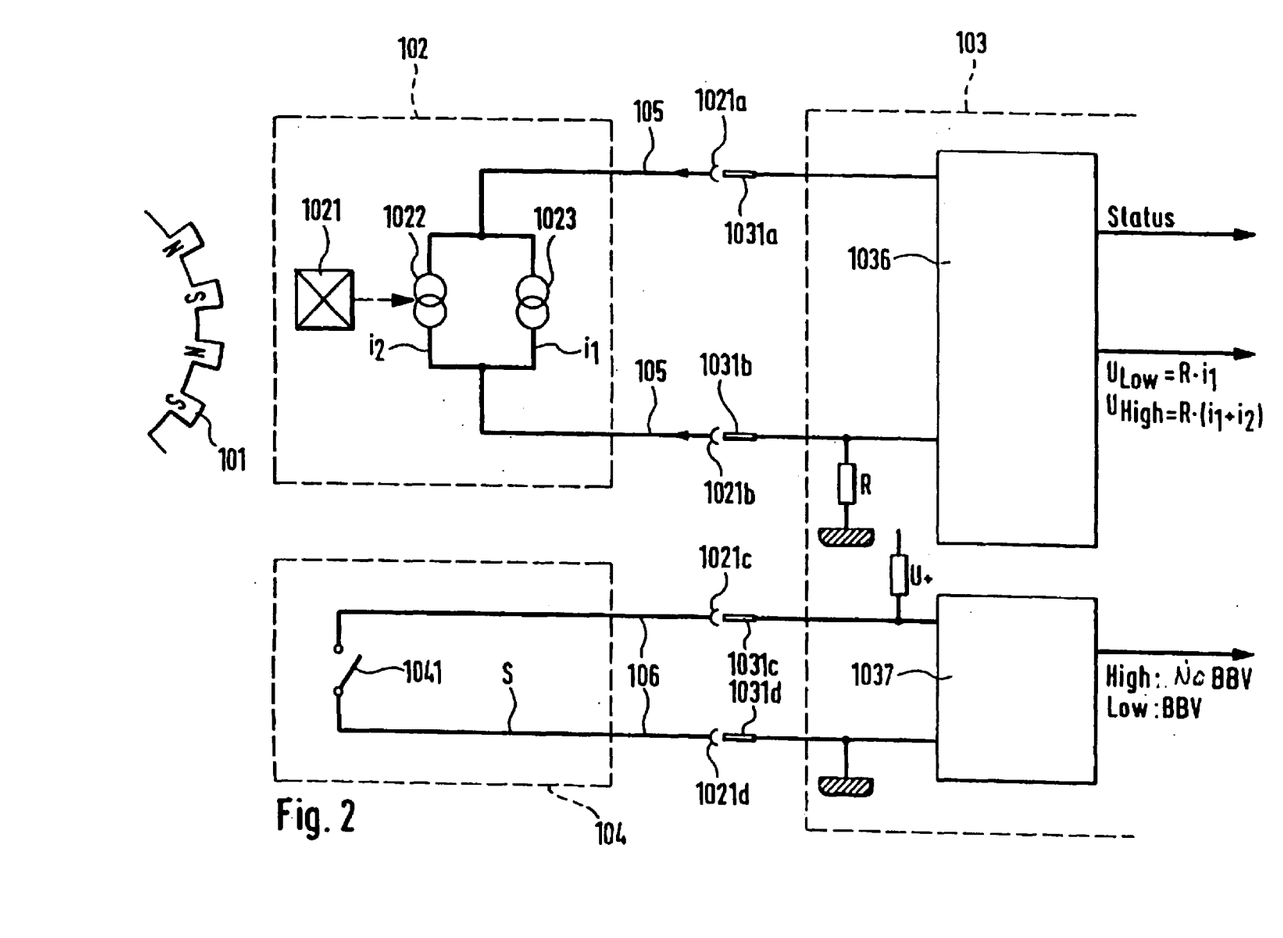
FIG. 2 shows a diagram of a combination of an active rotation speed sensor with a brake pad wear detector.
Figure 3A:
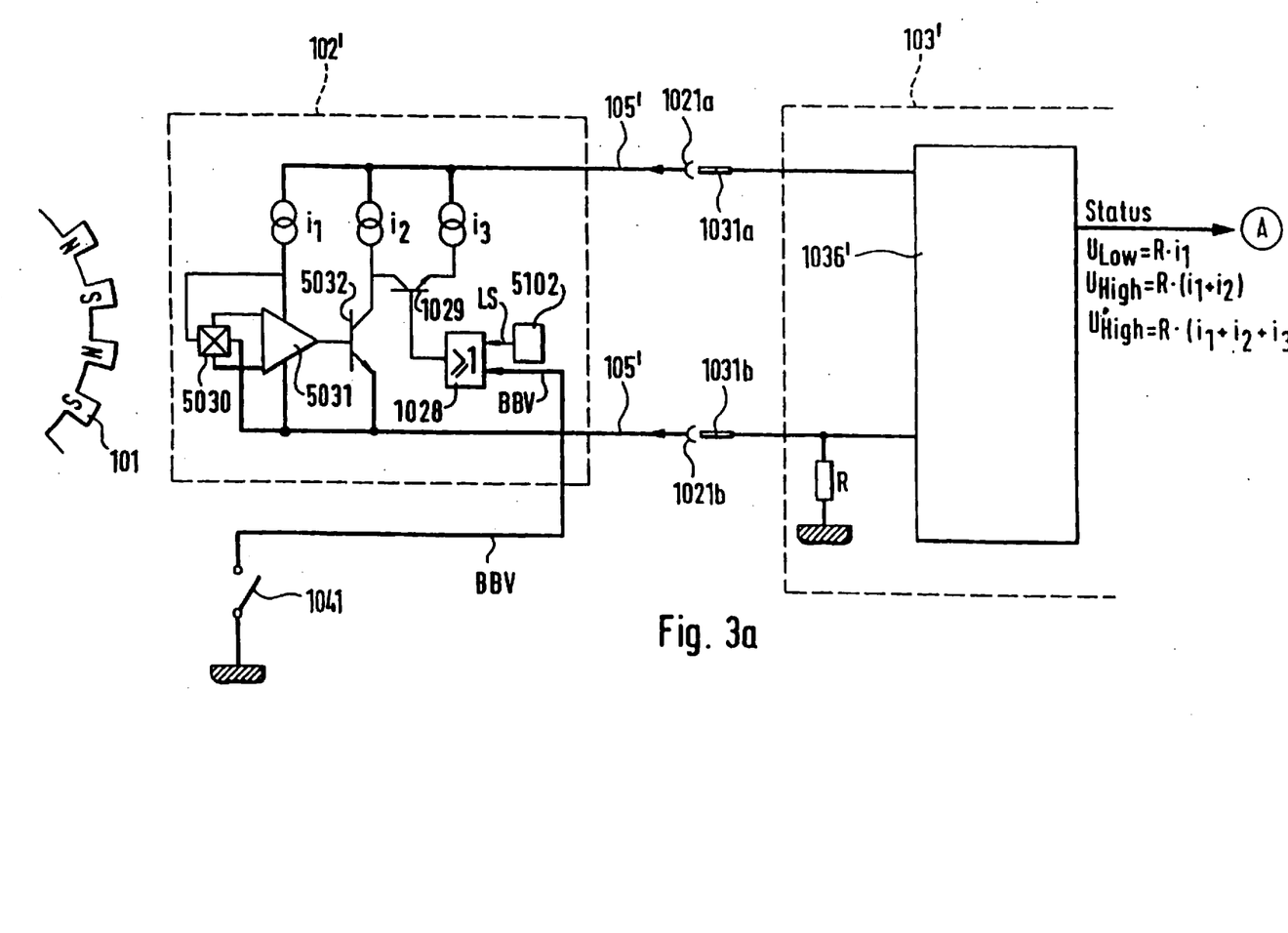
FIG. 3a shows a first embodiment of a circuit arrangement of a speed signal modification system according to the present invention.
Figure 3B:
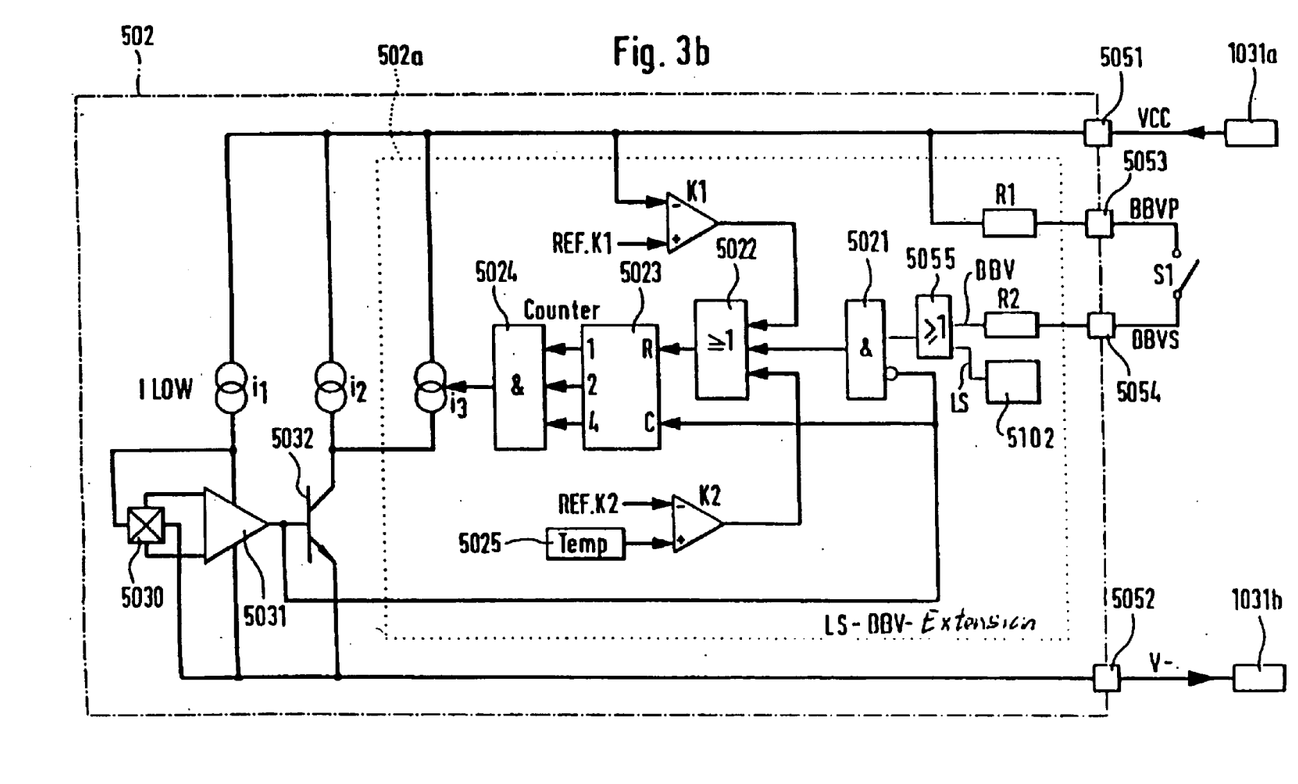
FIG. 3b shows a second embodiment of the circuit arrangement of the speed signal modification system according to the present invention.

FIGS. 2, 3a and 3b show various embodiments using a single wheel unit as an example.

FIG. 2 shows a combination of an active speed sensor with a brake pad wear detector. As described above, a known Hall speed sensor or a known magneto-resistive speed sensor can be provided as "active" speed sensor 102. FIG. 2 shows schematically that a sensor element 1021 scans a passive-magnetic type incremental rotor 101. As a function of the scanned increments of rotor 101, sensor element 1021 sets two current levels $i_1$ and $i_2$. This is shown in FIG. 2 with two power sources 1022 and 1023 being switched on and off.

Speed sensor 102 is connected to controller 103 via lines 105 using plug connectors 1021a and b and 1031a and b. Input amplifier 1036 detects, with the help of input resistor R, the voltage values corresponding to the current levels of speed sensor 102

$$U_{Low} = R * i_1$$

$$U_{High} = R * (i_1 + i_2)$$

Figure 4:
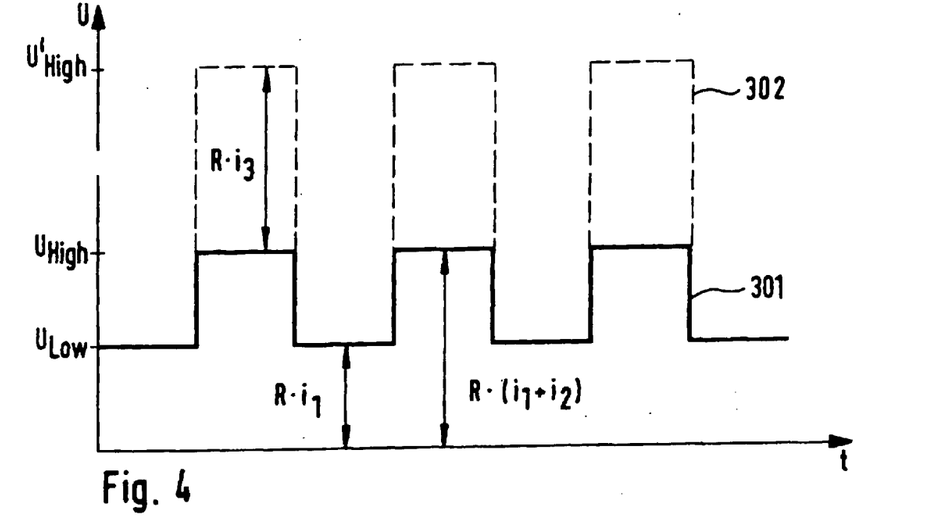
FIG. 4 shows a first graphical representation of output signal curves for the system illustrated in FIGS. 3a and 3b.

FIG. 4 shows a typical curve with wheel speed that is basically constant in lower signal line 301. The desired wheel speed is obtained by evaluation of the frequency of this signal.

The bottom part of FIG. 2 shows schematically a conventional brake-pad-wear detector 104 on a wheel brake. As described above, the brake-pad-wear sensor, known as such from the related art, determines the wear on the brake pad of a vehicle brake in that e.g., contact pins are embedded at a specific depth of the brake pads and trigger a contact upon actuation of the brakes (the brake pad is pressed onto the brake disc) when the brake pad is worn to this depth. This contact is indicated in FIG. 2 with switch 1041. In normal cases, (no brake pad wear requiring display) switch 1041 is open, voltage U+ not being grounded. If the brake pad reaches a certain degree of wear, switch 1041 is closed, which is detected because of grounding through connection 106 or plug connectors 1012 and 1031 in evaluation circuit 1037.

As can be seen in the embodiment shown in FIG. 2, separate signal lines 105 and 106 are necessary in each case for transmission of wheel speed information and information about brake pad condition.

The system according to the present invention will now be explained using FIGS. 3a and b. In this embodiment, speed sensor 102 described in FIG. 2 was supplemented with additional current source $i_3$, which is arranged in parallel to the speed sensor shown in FIG. 2.

In FIG. 3a, additional power source $i_3$ can be connected via transistor 1029 into the power circuit between the speed sensor and the evaluation unit if transistor 5032 is switched to transmission (forward).

Transistor 1029 is controlled by logical OR gate 1028. Signal S or BBV coming from switch 1041 already described using FIG. 2, and signal LS coming from block 5102 are applied to OR gate 1028. As described above, switch 1041 changes its switching status if during an actuation of the brakes a specific brake pad wear is recognized. Generation of signal LS and the function of sensor element 5030 and comparator 5031 will be described below using FIGS. 6 and 7.

Figure 6:
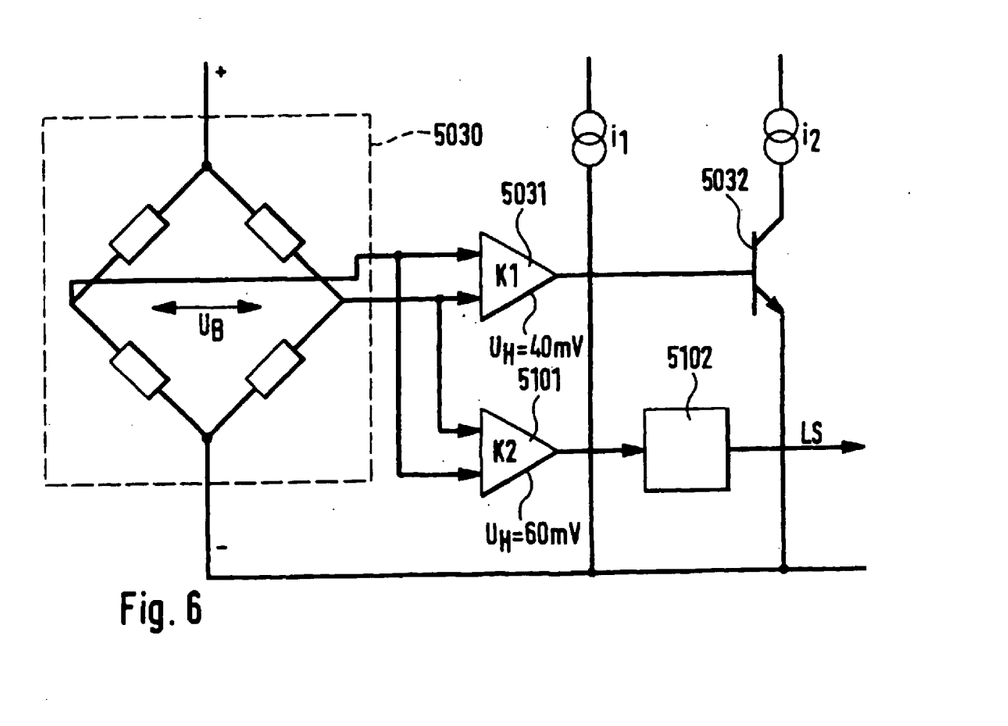
FIG. 6 shows an exemplary arrangement for detecting an excessive air gap.

FIG. 6 shows, as an example, sensor element 5030 and the detection of excess distance of a Hall or magneto-resistive sensor from the ring gear of the vehicle wheel that has already been described, whose speed of rotation will be detected. Sensor element 5030 is the sensor element indicated with the same reference numbers in FIGS. 3a and 3b. Sensor element 5030 is a known Wheatstone bridge with a typical ring-shaped arrangement of resistors. As the individual segments of the ring gear that is not shown (101/FIG. 3a) pass by, bridge voltage $U_B$ is generated in this Wheatstone bridge and is supplied to comparators 5031 and 5101. Comparator 5031 corresponds to the comparator in FIGS. 3a and 3b with the same reference symbols and is used to evaluate the wheel speed. Another evaluation of the bridge voltage takes place in comparator 5101 in such a way that this bridge voltage is compared to a relatively high threshold value $U_H$. More details will be given on the background of the two threshold comparisons in the following using FIG. 7.

Figure 7:
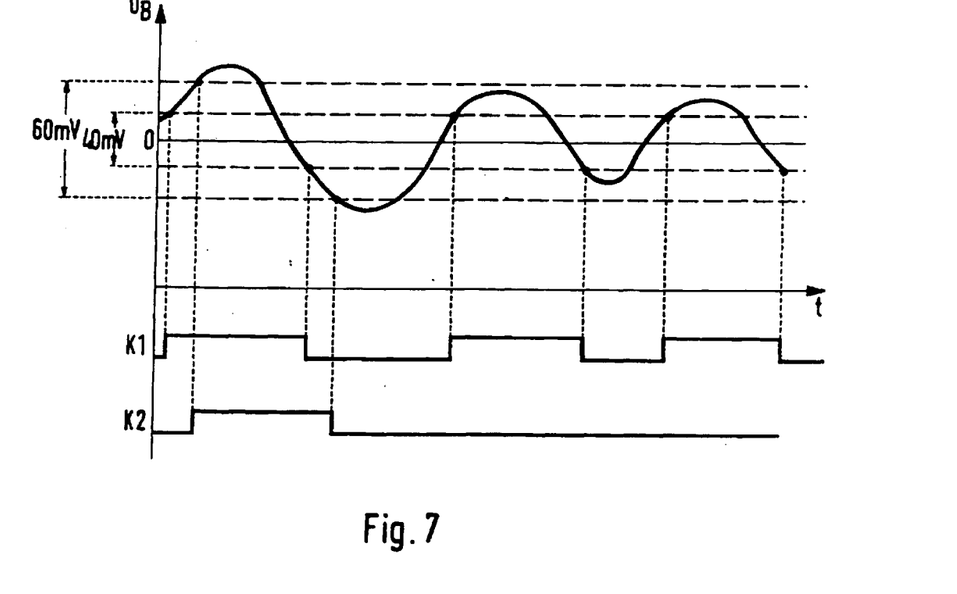
FIG. 7 shows a graphic representation of output signal generated using the arrangement illustrated in FIG. 6.

FIG. 7 shows a typical signal curve of the bridge voltage over time. The bridge voltage periodically increases and periodically decreases depending on the speed of passage of the individual ring gear segments (101/FIG. 3a). If the distance, the air gap, between the ring gear and Wheatstone bridge 5030 remains constant, the bridge voltage has a constant amplitude. However, if this distance becomes too great, the bridge voltage amplitude decreases. This case is shown in FIG. 7.

A first threshold comparison in comparator 5031 compares the bridge voltage signal to a relatively low threshold value, e.g., 40 mV. On the output side, comparator 5031 then supplies the triggering signal, shown in bottom signal curve K1 in FIG. 7, for current sources $i_1$ and $i_2$ (see FIGS. 5a and 5b). Therefore, signal K1 represents the wheel speed, even given an increasing air gap. Comparator 5101 checks the bridge voltage signal amplitude, in that a relatively high threshold of e.g., 60 mV is set in this comparator. If the distance between the ring gear and the Wheatstone bridge, the air gap, is sufficiently small, the amplitude of the bridge voltage signal is greater than the threshold of comparator 5101. The output signal of comparator 5101 is shown, as can be seen in lower signal curve K2 in FIG. 7, in regular operation with a time delay of signal K1 compared to signal K1. However, if comparator signal K2 fails to appear, the bridge-voltage signal amplitude decreases, which indicates an excessive air gap.

The absence of signal K2 is detected in unit (e.g., detector) 5102 and results in generation of signal LS. Unit 5102 is indicated in FIGS. 3a and 3b with the same reference numbers.

In summary regarding air gap recognition, it can be stated that the speed signals of a wheel are detected by using an active sensor, e.g., Hall sensor or magneto-resistive sensor. The sensors have a Wheatstone bridge that is unbalanced by a changing magnetic field. The speed signal is obtained from this unbalance. The amount of unbalance has a fixed relationship to the magnitude of the magnetic-field difference between the two halves of the bridge. Among other things, the magnetic-field difference is a function of the distance of the sensor from the magnet wheel. If the amount of bridge unbalance is evaluated, a statement can be made on the air gap between sensor and magnet wheel, and thus on the signal quality of the speed signal. This evaluation can be carried out with comparator 5101, which has a greater hysteresis ($U_H$=60 mV) than the normal useful signal comparator 5031 ($U_H$=40 mV). If the air gap is small, both the comparators switch, but if the air gap is too large only the useful signal comparator 5031 switches. This provides an early warning system for an air gap that is too large without simultaneously losing the wheel speed information. This information can be used, for example, as an end-of-the-line check during vehicle manufacturing, in the shop or while driving.

As FIG. 3a shows, transistor 5032 is triggered as a function of comparator 5031 described in FIGS. 6 and 7. If transistor 1029 is blocked, current level $i_1$ (low level) and $[i_1+i_2]$ (high level), whose frequency indicates the wheel speed, are periodically present at output 105' of sensor unit 102'.

By triggering transistor 1029, current source $i_3$ is superimposed on current level $[i_1+i_2]$ if either signal LS (unit 5102/FIG. 6) represents an air gap that has to be displayed "or" signal BBV represents a brake pad wear that has to be displayed. The logical "or" operation occurs in logical OR gate 1028. If transistor 1029 is switched to transmission (forward), the high level of the speed signal increases at output 105' to the level $[i_1+i_2+i_3]$ (high level'). Output 105' is connected to input 1031b of the controller i.e., of evaluation unit 103'.

Depending on the switching status of transistor 1029 and as a function of signal BBV "or" signal LS, input amplifier 1036', with the help of input resistor R, detects the voltage values corresponding to the above-mentioned current levels $$U_{Low}=R*i_1$$

$$U_{High}=R*(i_1+i_2)$$

or $$U_{High}'=R*(i_1+i_2+i_3)],$$

depending on whether a brake pad wear that needs to be displayed or an air gap that needs to be displayed has been recognized ($U_{High}'$) or not ($U_{High}$).

In addition to typical curve 301 already described with additional power source 1014 switched off, upper signal line 302 in FIG. 4 shows the signal curve with power source $i_3$ switched on. The upper signal level (high'-level) is thus shifted by offset ($R*i_3$) compared to lower signal level 301 (high-level).

Figure 3C:
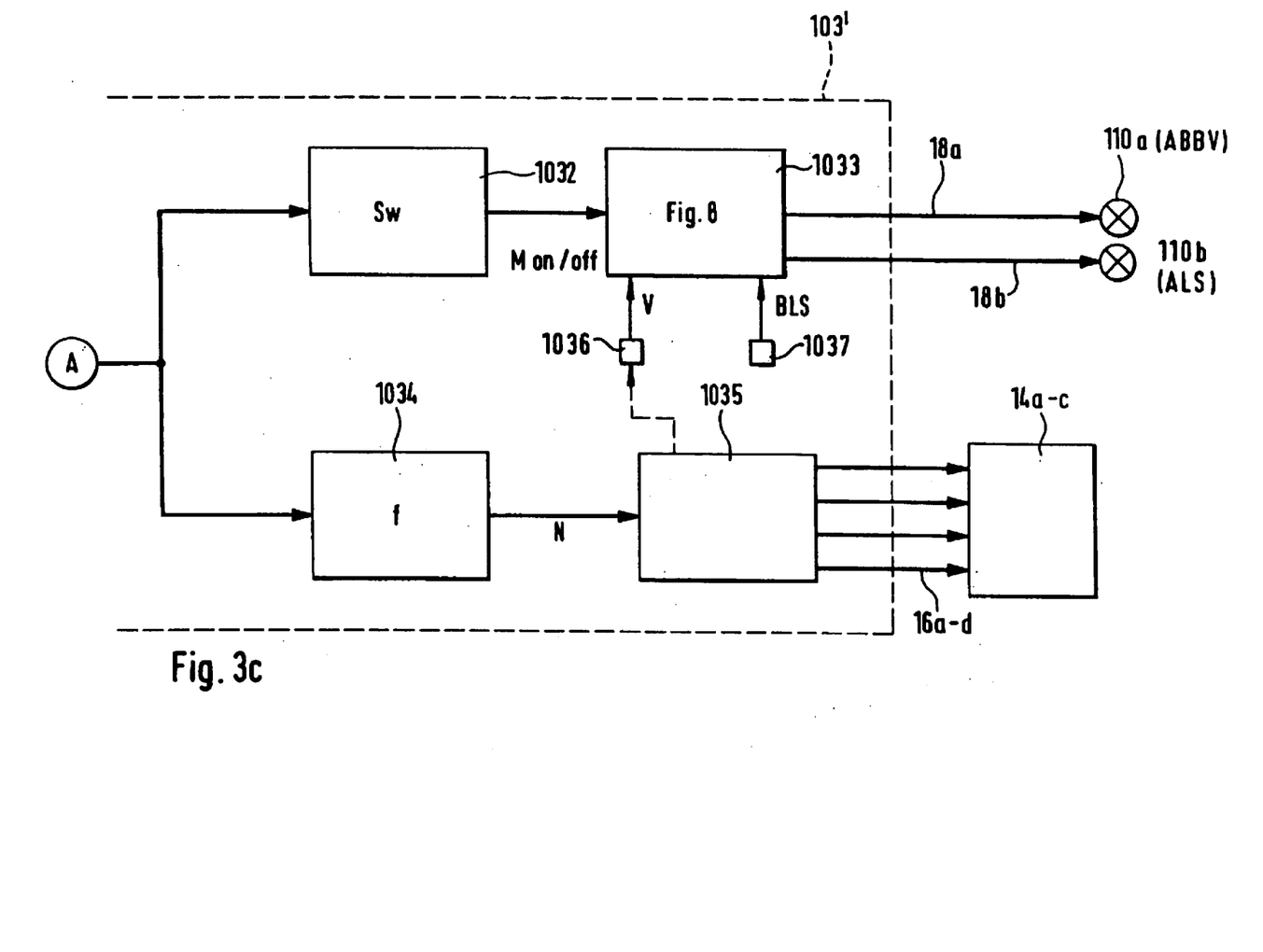
FIG. 3c shows a block diagram of an evaluation arrangement according to the present invention.

Desired wheel speed N is obtained by evaluating the frequency of these signals shown in signal line 301 or 302 in block 1034 of FIG. 3c. Speed N can then be supplied to the actual brake-, drive- or other closed loop/open loop control 1035. In the case of brake or drive closed loop/open loop control, wheel brakes 11a–d are driven (signals 14a–d) as a function of the speeds detected. Frequency evaluation 1034 is designed in such a way that the frequency of signal lines 301 and 302 is determined independently of the offset caused by the position of switch 1041 mentioned above. In this manner, speed detection is always ensured independently of recognized brake pad wear that is too great or a recognized air gap that is too large. This is important for system availability.

In addition to evaluation 1034 mentioned above regarding wheel speeds, signals 301 and/or 302 are supplied to threshold comparator 1032. This threshold comparator 1032 recognizes whether the offset caused by switch 1029 ($R*i_3$) is present at the high level or not. The threshold in unit 1032 lies between levels $[R*(i_1+i_2)]$ and $[R*(i_1+i_2+i_3)]$.

Therefore, on the output side of threshold comparator 1032, a signal $M_{on/off}$ is present which gives information on whether either a brake pad wear that needs to be displayed and/or an air gap that needs to be displayed are present (signal value $M_{on}$) or not (signal value $M_{off}$). Signal M with the signal value $M_{on}$ or $M_{off}$ is supplied to block 1033, the function of which will be described in more detail using FIG. 8. In addition, output signal BLS of one brake light switch 1037 and signal V (block 1036) representing the longitudinal vehicle velocity are supplied to block 1033.

Block 1037 represents a switch that, in a known manner, senses an actuation of the brakes in such a way that the switch is connected to the brake pedal that can be actuated by the driver. Such a switch (brake light switch) is generally present on the vehicle for actuation of the brake light. Signal BLS can naturally also be generated as an alternative or as a supplement to the brake light switch in block 1037 as a function of the momentary brake pressure. A signal representing the momentary brake pressure is available in many braking systems (anti-lock braking systems, traction control systems or driving dynamics systems) in a known way in the corresponding controller.

Signal V representing the longitudinal vehicle velocity can be formed in a known manner from the wheel movements of one or several wheels and is also generally present as a reference speed, as it is called, in many braking systems (anti-lock braking systems, traction control systems or driving dynamics systems) (dotted line to brake, drive or other closed loop/open loop control 1035).

Figure 8:
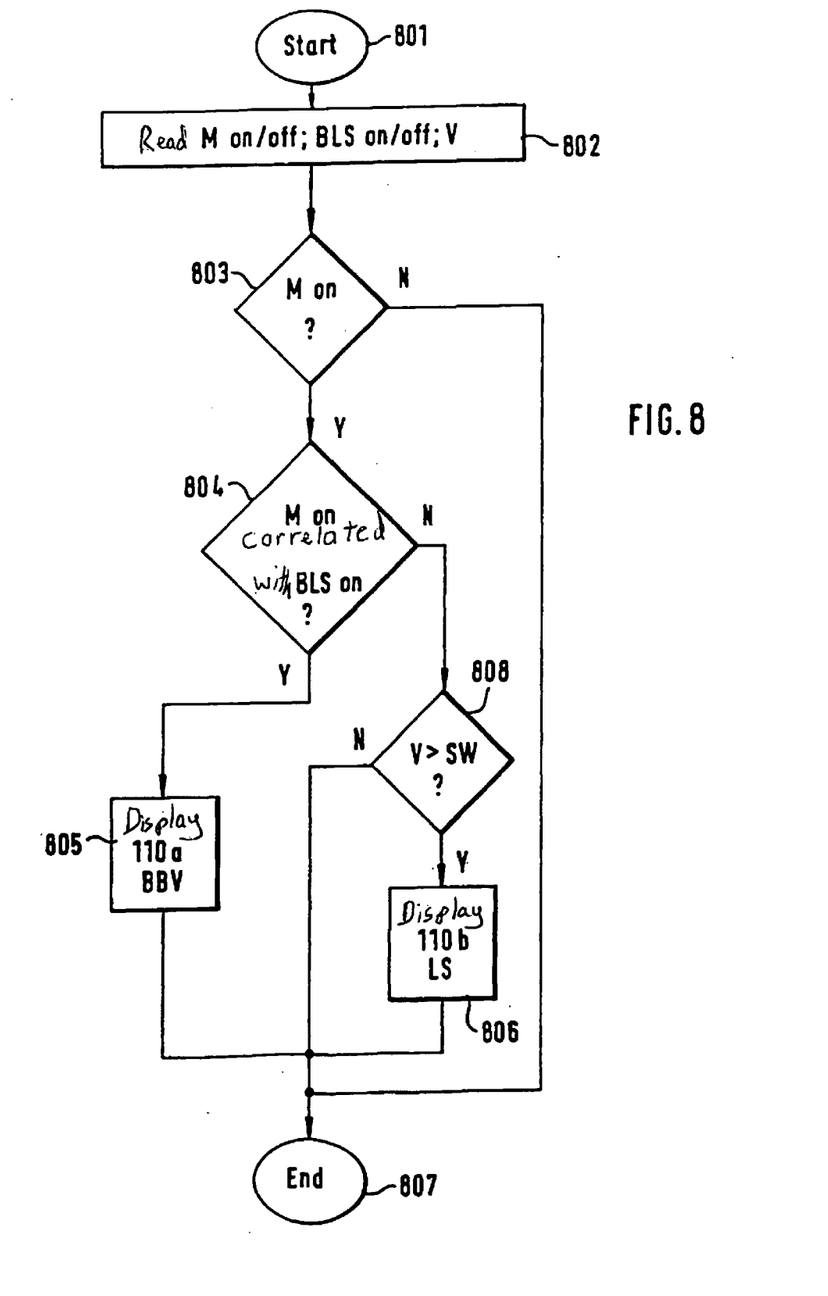
FIG. 8 shows a flow chart diagram of a block illustrated in FIG. 3c.

In FIG. 8, after start step 801, signal value $M_{on/off}$ that is currently present at block 1033 and the current value of signal $BLS_{on/off}$ and V are input in step 802. There is an inquiry in step 803 of whether signal M has the value $M_{on}$, value $M_{on}$ being output by block 1032 if the speed signal high level is increased.

If there is no increase in the high level of the speed signal, value $M_{off}$ is output, which means that switch 1029 (FIG. 3a) is open and consequently neither an air gap that needs to be displayed (signal LS, FIG. 3a), nor a brake pad wear that needs to be displayed (signal BBV, FIG. 3a) is present. In this case, processing moves on immediately to final step 807.

If there is an increase in the speed signal high level, after step 803 the processing goes over to step 804 in which a determination is made of whether signal $M_{on}$ is correlated in time with brake actuation signal $BLS_{on}$. This can mean there is a determination of whether signal value $M_{on}$ only occurs if a brake actuation is simultaneously displayed due to signal $BLS_{on}$. Such a correlation can occur due to the one-time simultaneous occurrence of values $M_{on}$ and $BLS_{on}$, but it can also be set so that determination occurs only after a predefinable repetition frequency of such a correlation.

If in step 804 a correlation is found between the occurrence of signal values $M_{on}$ and $BLS_{on}$, this means that a change in the speed signal occurs through switching on the power source $i_3$ whenever a brake actuation occurs. As described previously, excessive brake pad wear is detected only by contact with the brake disc of the contact pin embedded in the brake pad, i.e., only during a brake actuation. A possible air gap that is too large between sensor element 5030 (FIG. 3a) and ring gear 101 (FIG. 3a) is, on the other hand, independent of brake actuation. A correlation in time between the occurrence of signal values $M_{on}$ and $BLS_{on}$ thus means that excessive brake pad wear is present. In step 805, this brake pad wear is displayed in display 110a by outputting signal 18a.

If in step 804 no correlation is determined between the occurrence of signal values $M_{on}$ and $BLS_{on}$, this means that a change in the speed signal by switching on power source $i_3$ is present, independently of brake actuation. This indicates an air gap that is too large (defective quality of the speed signal) between sensor element 5030 (FIG. 3a) and ring gear 101 (FIG. 3a). If there is now another (optional) inquiry in step 808 of whether the vehicle longitudinal speed exceeds a predefinable threshold value SW, it means that if a threshold value is exceeded, an excessive air gap is present. In step 805, this defective signal quality is displayed in display 110b by outputting signal 18b. If the vehicle is standing or only moving slowly, end step 807 will be triggered immediately.

While the embodiment shown in FIG. 3c has separate displays 110a and 110b for displaying excessive brake pad wear and defective quality of the speed signal, respectively, a single display can also be provided since both errors can be rated equivalent in severity in driving operation and require immediate shop service. The cause of such a display being activated can be clearly diagnosed using appropriate service instructions.

In the embodiment shown in FIG. 3a, in the presence of excessive brake pad wear and/or an excessively large air gap, each speed-signal high level is increased. In the following variation, on the other hand, only every nth high level is increased, in the concrete example, every fourth high level. This minimizes the loss of power caused by the offset. In addition, this version of the invention has the advantage during transmission of the brake pad wear that possible bounce in the brake pad wear switch will not result in incorrect display, since the offset is only initiated after the occurrence of n high levels.

FIG. 3b shows this second embodiment variation of the present invention. In it, reference number 502 designates a unit which, similar to unit 102' described above (FIG. 3a), combines the actual speed detection and parts of the brake pad wear detection. Unit 502 is connected by connections 5051 and 5052 to inputs 1031a and 1031b of a controller not shown in FIG. 3b. This controller corresponds basically to unit 103' explained in FIG. 3c.

In addition, unit 502 is connected by connections 5053 and 5054 to brake pad switch S1 (corresponds to switch 1041 in FIGS. 2 and 3a). Switch S1 is closed in the normal case in this embodiment (no brake pad wear needing to be displayed). In addition, FIG. 3b shows block 5102 that generates signal LS (air gap/signal quality), which was already described using FIGS. 6 and 7.

The actual speed detection is carried out analogously to the manner described using FIGS. 2 and/or 3a.

If the brake pad reaches a specific degree of wear, switch S1 is opened. Because of the open position of switch S1, the upper input of logical OR gate 5055 shown in FIG. 3b will be at low level; with switch S1 closed, the corresponding input of logical OR gate 5055 will be at high level. If an excessively large air gap is found in block 5102, OR gate 5055 at the corresponding input will be assigned a low level.

Therefore on the output side of OR gate 5055, high level is always present if neither a brake pad wear that needs to be displayed nor an excessively large air gap is detected. Otherwise there is a low signal present at the output side of OR gate 5055.

The triggering signal of transistor 5032 is supplied, inverted, to the lower input of logical AND gate 5021. This means that a triggering of transistor 5032 (power source $i_2$ switched on, speed signal at high level) is present as low level (inverted) at the logical AND gate 5021. When power source $i_2$ is switched off by the transistor (low level at transistor 5032) it results, because of the inversion, in the presence of a high level at the lower input of AND gate 5021. On the output side, a high level is present at AND gate 5021 if neither brake pad wear that needs to be displayed (switch S1 closed, upper input of OR gate 5055 at high level) nor an air gap that needs to be displayed (lower input of OR gate at high level) is present and at the same time power source $i_2$ is switched off. Otherwise, the AND gate output is at low level.

The output of AND gate 5021 is applied to the input of logical OR gate 5022. In addition, comparators K1 and K2 are connected to the other two inputs of OR gate 5022.

Comparator K1 compares input voltage VCC of sensor unit 502 with a predefinable threshold value REF.K1. This is done by detecting low voltages, which can impair proper operation of unit 502. If a low voltage such as this occurs, thus if VCC is lower than REF.K1, a high level will be present at the upper input of OR gate 5022. Otherwise, this input is at low level.

Comparator K2 compares the temperature detected by temperature sensor 5025 with predefinable threshold value REF.K2. This means temperature sensor 5025 measures the temperature to which sensor unit 502 is subject. In this context, temperature sensor 5025 is integrated directly in a known manner into the integrated circuit (IC) of sensor unit 502, e.g., as a diode, whose temperature-dependent flux voltage is measured. The basis of temperature measurement is that sensor unit 502 is generally near the wheel, i.e., also installed in the proximity of the brake discs. The heat coming from the brake discs can heat sensor unit 502 in such a way that proper operation of unit 502 is impaired. If overheating of this type occurs, thus if the temperature measured is greater than REF.K2, a high level will be present at the lower input of OR gate 5022. Otherwise, this input is at low level.

Therefore, a high signal is present at the output side of OR gate 5022 if at least one of the three inputs is at high level, thus if either overheating of sensor unit 502 or
low voltage or
no brake pad wear that needs to be displayed and no air gap that needs to be displayed are present and, at the same time, power source $i_2$ is switched off.
Otherwise, the OR gate output is at low level.

The output of OR gate 5022 is connected to reset input R of counter 5023. Counter 5023 is reset when there is a high signal at input R. Clock input C of counter 5023 is connected to the control signal for transistor 5032. Input C thus receives a high level if power source $i_2$ is switched on and a low level if power source $i_2$ is switched off. Counter 5023, designed in a known way as a flip-flop switch, is therefore always switched when power source $i_2$ is switched on or off. Counter 5023 has three outputs, which are at high level when the level present at clock input C has changed from low to high the first, second and fourth time. This means that three high levels are thus present at AND gate 5024, to which the outputs of counter 5023 are supplied, when power source $i_2$ is switched on for the fourth time. In this case (all three inputs of AND gate 5024 are at high), the AND gate supplies a high level at its output side, after which third power source $i_3$ is switched on. Current $i_3$ from power source $i_3$ is then superimposed on the current that is present at this time $(i_1+i_2)$, which leads to a total current $(i_1+i_2+i_3)$ at output 5052. Power source $i_3$ can be switched on by a transistor that is not shown in FIG. 3b which is connected in series to this power source $i_3$. This would then occur similarly to switching power source $i_3$ on and off with transistor 1029 shown in FIG. 3a.

Figure 5A:
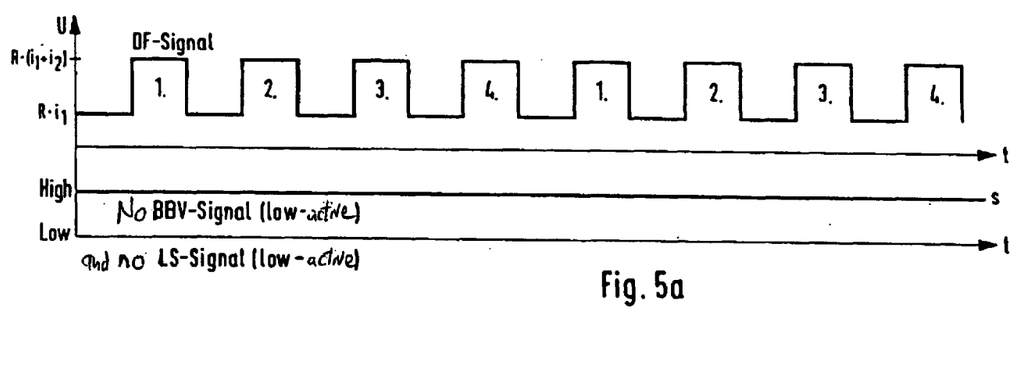
FIG. 5a shows a second graphical representation of the output signal curves for the system illustrated in FIGS. 3a and 3b.

FIG. 5a shows the signal present at output 5052 if switch S1 is closed (no brake pad wear that needs to be displayed) and no air gap that needs to be displayed are present. The upper input of AND gate 5052 shown in the lower signal line of FIG. 5a is then set high. Counter 5023 (input R) is always reset by OR gate 5022 if power source $i_2$ is switched off. This ensures that third power source $i_3$ remains switched off if no brake pad wear that needs to be displayed and no air gap that needs to be displayed are present. In controller 103' (input 1031b), the signal present at output 5052 is then converted via resistor R into a voltage, whereupon wheel speed N is determined by frequency analysis 1034 already described.

Figure 5B:
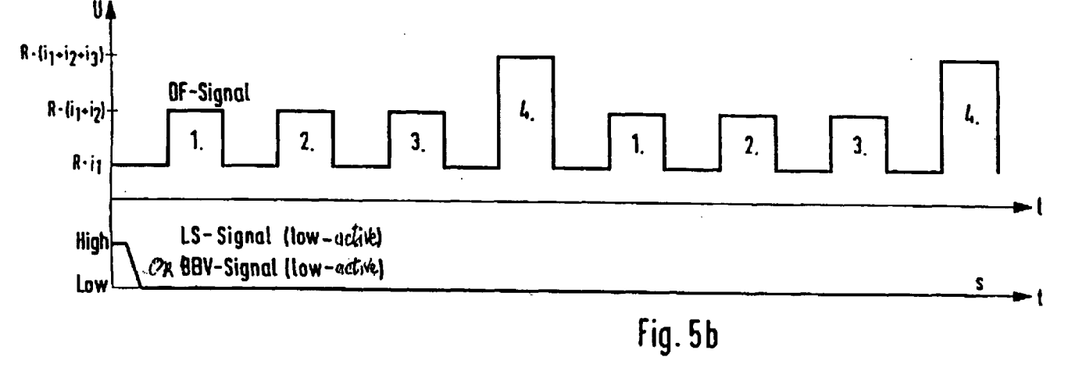
FIG. 5b shows a third graphical representation of the output signal curves for the system illustrated in FIGS. 3a and 3b.

FIG. 5b shows the curve of the signal present at output 5052 when switch S1 is open (brake pad wear that needs to be displayed) and/or an air gap that needs to be displayed is present. The upper input of AND gate 5052 that is shown in lower signal line of FIG. 5b is then set low. Counter 5023 (input R) is only reset by OR gate 5022 if a low voltage (comparator K1) or excess temperature (comparator K2) is present. In the normal case (neither over-voltage nor excess temperature) input R of counter 5023 is at low, whereupon power source $i_3$ is switched on each fourth time power source $i_2$ is switched on. This results in the speed signal curve shown in the upper part of FIG. 5b.

As already described using FIG. 3c, the signal present at output 5052 is converted into a voltage via resistor R in controller 103' (input 1031b), whereupon wheel speed N is determined by frequency analysis 1034 already described. In addition, threshold value comparison 1032 recognizes whether level $R^*(i_1+i_2)$ has been exceeded. In the case of a brake pad wear that needs to be displayed or an air gap that needs to be displayed, this is given by the increase of the fourth high level of the speed signal and is then evaluated by forming signal $M_{on}$ in unit 1022 as already described.

What is claimed is:

1. A system for changing a first signal which represents a rotational movement of a vehicle wheel, comprising:
    a first arrangement generating the first signal;
    a second arrangement generating a plurality of second signals, each one of the second signals representing different operating states of a plurality of devices; and
    a third arrangement modifying the first signal, in a single predefined manner, as a function of at least one of the second signals.

2. A system for evaluating a selected signal which represents a rotational movement of a vehicle wheel, the vehicle wheel including a wheel brake, a further signal for transmitting further information being modifiable in a predefined manner, the system comprising:
    a generating arrangement generating at least one first signal which represents a wheel-brake actuation; and
    an evaluating arrangement combining one of the selected signal and the further signal with the at least one first signal to form a plurality of second signals which represent the further information.

3. A system for modifying and evaluating a first signal which represents a rotational movement, comprising:
    a first arrangement generating the first signal;
    a second arrangement generating a plurality of second signals, each one of the second signals representing different operating states of a plurality of devices;
    a third arrangement modifying the first signal as a function of at least one of the second signals in a single predefined manner;
    a fourth arrangement generating at least one third signal which represents a brake actuation; and
    a fifth arrangement generating a plurality of fourth signals by combining one of the generated first signal and the modified first signal with the at least one third signal, the fourth signals representing different operating states of the devices.

4. The system according to claim 1, wherein the first arrangement includes a rotational-speed sensor, and wherein the vehicle wheel interacts with a brake pad of a wheel brake.

5. The system according to claim 2, wherein the wheel brake includes a brake pad, and wherein the further information includes one of a wear of the brake pad and a signal quality of the selected signal.

6. The system according to claim 3, wherein the devices include at least one of the first arrangement and a brake pad of a wheel brake.

7. The system according to claim 1,
    wherein the first signal has at least one of a plurality of current values and a plurality of voltage values, and
    wherein the third arrangement changes at least one of the current values and the voltage values to at least one of a respective further current value and a respective voltage value for a predetermined time period as a function of at least one of the second signals.

8. The system according to claim 3,
    wherein the first signal has at least one of a plurality of current values and a plurality of voltage values, and
    wherein the third arrangement changes at least one of the current values and the voltage values to at least one of a respective further current value and a respective voltage value for a predetermined time period as a function of at least one of the second signals.

9. The system according to claim 2, wherein the generating arrangement generates at least one additional signal which represents a vehicle velocity.

10. The system according to claim 3, wherein the fourth arrangement generates at least one additional signal which represents a vehicle velocity.

11. The system according to claim 2, wherein the evaluating arrangement has a linkage arrangement for forming the second signals as a function of a time correlation of the at least one first signal with a predefined change of the selected signal.

12. The system according to claim 3, wherein the fourth arrangement has a linkage arrangement for forming the fourth signals as a function of a time correlation of the at least one third signal with a predefined change of the first signal.

13. The system according to claim 1, wherein the first arrangement includes an active speed sensor.

14. The system according to claim 3, wherein the first arrangement includes an active speed sensor.

15. The system according to claim 1, wherein the second arrangement generates at least one of a third signal and a fourth signal of the second signals, the third signal representing a brake-pad wear on at least one vehicle wheel brake, the fourth signal representing an amplitude of a further signal associated with the first signal.

16. The system according to claim 3, wherein the second arrangement generates at least one of a fifth signal and a sixth signal of the second signals, the fifth signal representing a brake-pad wear on at least one vehicle wheel brake, the sixth signal representing an amplitude of a further signal associated with the first signal.

17. The system according to claim 1, wherein the first, second and third arrangements are mounted adjacent to the vehicle wheel.

18. The system according to claim 2, wherein the evaluating arrangement is mounted at a predetermined distance from the vehicle wheel.

19. The system according to claim 3, wherein the first, second and third arrangements are mounted adjacent to the vehicle wheel, and wherein at least one of the fourth and fifth arrangements is mounted at a predetermined distance from the vehicle wheel.

20. The system according to claim 3, wherein at least one of the fourth and fifth arrangements is mounted at a predetermined distance from the vehicle wheel.

* * * * *

UNITED STATES PATENT AND TRADEMARK OFFICE
CERTIFICATE OF CORRECTION

PATENT NO.         : 7,099,795 B1
APPLICATION NO. : 09/125404
DATED              : August 29, 2006
INVENTOR(S)       : Juergen Gerstenmeier et al.

It is certified that error appears in the above-identified patent and that said Letters Patent is hereby corrected as shown below:

Column 1, lines 9-10 change "at least one vehicle with the features set forth in the preambles of the independent claims." to --at least one vehicle wheel in a motor vehicle.--

Signed and Sealed this

Eighteenth Day of September, 2007

JON W. DUDAS
*Director of the United States Patent and Trademark Office*